United States Patent [19]

McDonald

[11] 4,076,650

[45] Feb. 28, 1978

[54] CATALYST SYSTEM FOR FLAME RETARDANT FINISHING

[75] Inventor: Harold McDonald, Harrington Park, N.J.

[73] Assignee: Stauffer Chemical Company, Westport, Conn.

[21] Appl. No.: 662,474

[22] Filed: Mar. 1, 1976

[51] Int. Cl.$^2$ ............................................. B01J 27/02
[52] U.S. Cl. ..................................... 252/440; 260/928; 252/8.1; 428/921; 427/53
[58] Field of Search ......................... 252/440; 260/928

[56] References Cited

U.S. PATENT DOCUMENTS

| 3,434,161 | 3/1969 | Walsh | 428/152 X |
| 3,855,359 | 12/1974 | Weil | 260/837 R X |
| 3,894,122 | 7/1975 | Dürsch et al. | 260/928 |

*Primary Examiner*—Patrick P. Garvin
*Assistant Examiner*—William G. Wright
*Attorney, Agent, or Firm*—William R. Robinson

[57] ABSTRACT

A catalyst system comprised of copper sulfate and hydrogen peroxide is utilized to cure unsaturated flame retardants on textiles. The resultant flame retarded textiles have unusually good hand (softness); even with high add-on (weight percent of chemicals applied to a textile) of the flame retardants. Conventional techniques and equipment can be used with the system of the present invention.

1 Claim, No Drawings

CATALYST SYSTEM FOR FLAME RETARDANT FINISHING

BACKGROUND OF THE INVENTION

1. Field of the Invention

This invention relates, in general, to catalyst systems for flame retardants and particularly concerns flame retardant finishing of textiles wherein the flame retarded textile has excellent hand and a high degree of flame retardancy.

2. The Prior Art

Numerous catalysts for curing flame retardants in textile finishing processes are known. It can be difficult, however, to durably and effectively flame retard textiles without detrimentally affecting the hand (softness) of the fabric. Thus, it is often necessary to sacrifice either hand or flame retardant effectiveness in processes for flame retardant finishing of textiles. This is due to the requirement that relatively high add-ons (weight percent of chemicals applied to a textile) of flame retardants are often necessary to achieve effective flame retardancy with resultant poor hand, i.e. stiffness in the flame retarded fabric.

In accordance with the present invention, the combination of copper sulfate and hydrogen peroxide effectively catalyzes the finishing of textiles with unsaturated flame retardants. The flame retarded textiles have excellent hand, even with high add-ons of the flame retardants.

SUMMARY OF THE INVENTION

In accordance with the present invention, a composition is provided that can be utilized as a catalyst in durably and effectively flame retarding textiles with unsaturated flame retardants. High add-ons of the flame retardant can be provided on the textile, giving excellent flame retardancy and excellent hand.

The composition of the present invention is comprised of copper sulfate and hydrogen peroxide.

Flame retardants such as the oligomeric vinylphosphonates disclosed in U.S. Pat. No. 3,855,359 can be utilized in accordance with the present invention. Optional comonomers can also be added in combination with the flame retardants as a means of achieving variations in the properties of the flame retarded textiles. These comonomers will be further described in the detailed description below.

DETAILED DESCRIPTION OF THE INVENTION

The weight ratio of copper sulfate to hydrogen peroxide in the composition of the present invention can be from about 1:1 to about 1:210. The term copper sulfate, when used in the present disclosure, is defined as copper sulfate and its hydrates. The weight ratio of the composition of the present invention to the unsaturated flame retardant can be from about 1:2 to about 1:20. Preferred ratios for particular textiles can be determined by one skilled in the art by experimentation on the basis of the foregoing ranges. This composition has excellent pad bath stability and a long shelf life as compared to prior art compositions.

The unsaturated flame retardants that can be used in accordance with the present invention include various oligomeric vinylphosphonates. These vinylphosphonates are described in the '359 patent cited above. Some examples of these oligomers are set forth below. The indicated structures are those of average or typical oligomers. In most cases, the oligomers are mixtures as is commonly the case in oligomerization and polymerization. Furthermore, the indicated structures illustrate only the main oligomeric vinylphosphonate structures. These structures are synthesized in accordance with the '359 patent as follows:

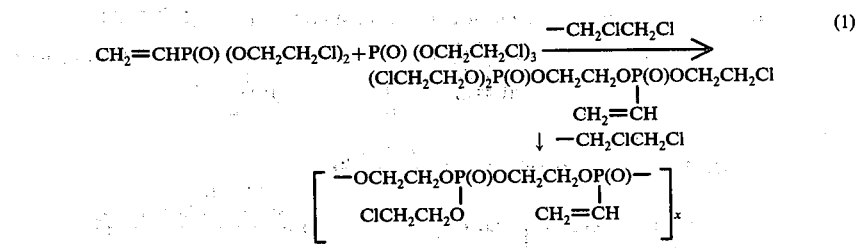

where $x$ can be from about 2 to about 20. The chains are terminated by 2-chloroethoxy phosphate or phosphonate groups. Since the tris(2-chloroethyl)phosphate can react as a trifunctional reagent, branched structures related to the above are also believed to be formed.

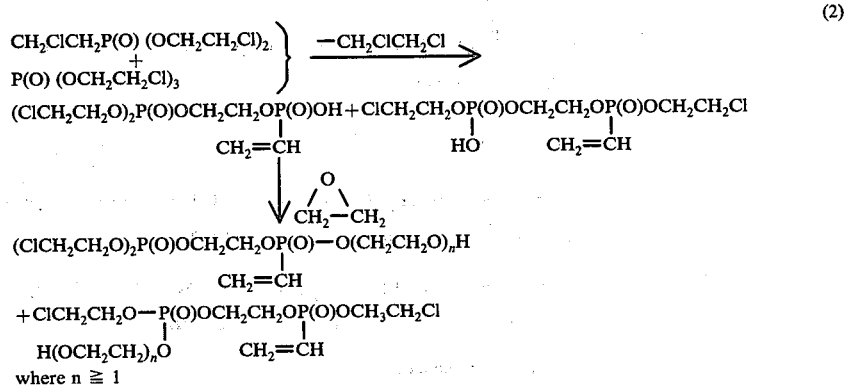

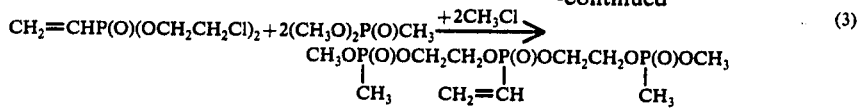
(3)

By employing reactant quantities corresponding to the above stoichiometry, the actual product obtained contains higher oligomers besides the product indicated by the formula. By employing an excess of dimethyl methylphosphonate, and subsequently distilling off the excess, a residual product highly predominent in the indicated product compound can be obtained.

The above product formula is only an inexact representation of the product structure. The end groups can, on stoichiometric grounds, be either $CH_3OP(O)(CH_3)-$ or $ClCH_2CH_2OP(O)(CH=CH_2)-$, and one or both can be present in the product. It is not known if the methylphosphonate and vinylphosphonate repeating units are distributed randomly, alternatively or in blocks. Acidic by-product structures also known to be present in the actual product are not represented by the formula.

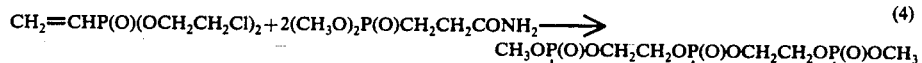 (4)
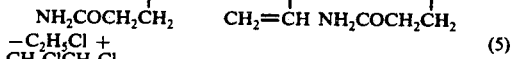
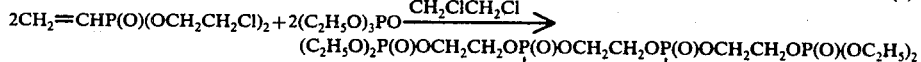 (5)
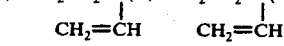
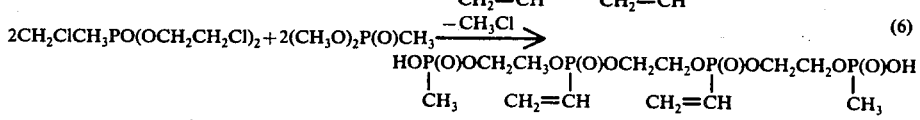 (6)
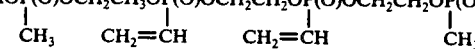

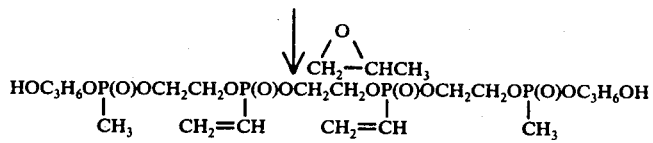

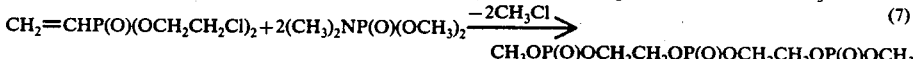 (7)

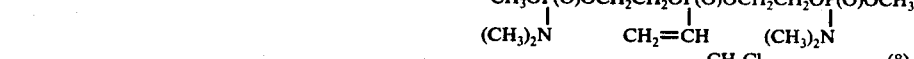 (8)

(C$_6$H$_5$O)$_2$P(O) $\left[\begin{array}{c} OCH_2CH_2OP(O)- \\ | \\ CH_2=CH \end{array}\right]\left[\begin{array}{c} -OCH_2CH_2OP(O) \\ | \\ C_6H_5O \end{array}\right]_n$ OCH$_2$CH$_2$OP(O)(OC$_6$H$_5$)$_2$ where m ≥ 1 and n = 0 to m

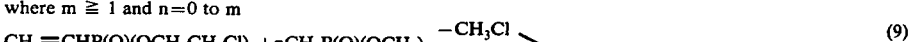 (9)

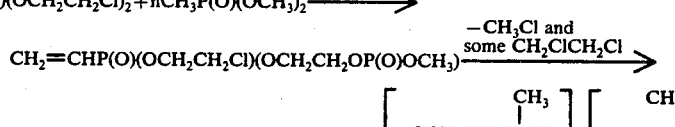

where n > 0 and x and y ≥ 1

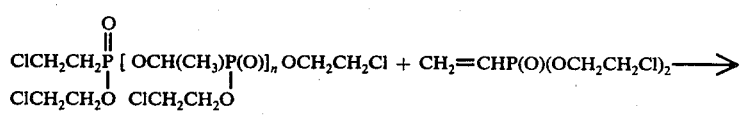 (10)

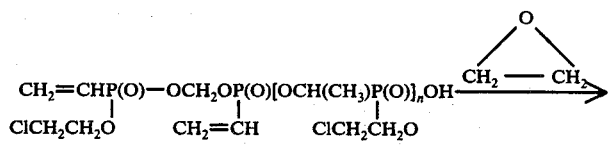

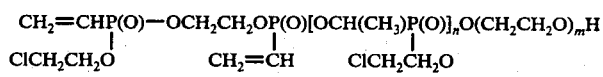

where m = 1 to about 5 where n = 0 to 10

(11)

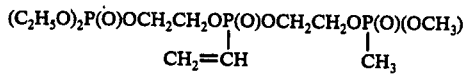

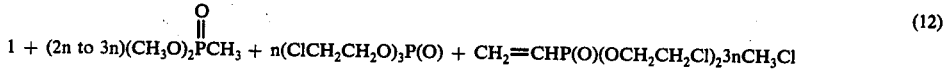(12)

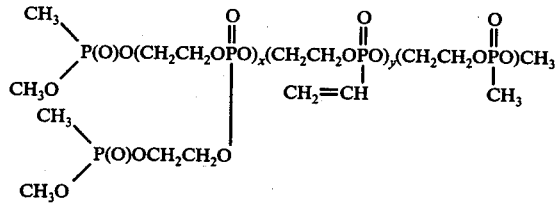

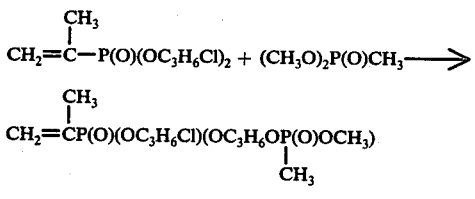(13)

$$CH_2=C(CH_3)-P(O)(OC_3H_6Cl)_2 + (CH_3O)_2P(O)CH_3 \longrightarrow$$

$$CH_2=C(CH_3)P(O)(OC_3H_6Cl)(OC_3H_6OP(O)OCH_3)\overset{|}{CH_3}$$

where $-C_3H_6-$ can be $-CH_2CH(CH_3)-$ and/or $-CH(CH_3)CH_2-$

As can be seen from a study of the above given reactions, by having an exact 1:1 reactant ratio of $CH_2=CHPO(OCH_2CH_2Cl)_2$ and $(RO)_2P(O)X$ and running the reaction to completion, a high moleculer weight polymer product can be obtained. Alternatively, by having an excess of either reactant, the chain length of the product can be controlled and its end groups will be primarily those derived from the reactant which is present in excess.

The foregoing oligomeric vinylphosphonates are soluble in many organic solvents and in water. Accordingly, they can be applied to textile substrates while dissolved in water or any of the organic solvents commonly used in the solvent finishing of textiles, for example, trichloroethylene, dichloroethane, methylene chloride, and mixtures thereof.

In accordance with the present invention, solutions containing the unsaturated flame retardants can contain one or more of the foregoing oligomeric vinylphosphonates.

Numerous methods can be utilized to flame retard textiles in accordance with the present invention. It is merely necessary to have the unsaturated flame retardants evenly absorbed throughout the mass of the textile or to apply it to at least one surface of the textile by means of any convenient procedure. Thus, solutions containing said flame retardants can be applied by being sprayed or printed onto one or both sides of the textile, by fabric lamination, by pigment printing techniques or, as is more frequently the case, passing the textile through or padding with said solutions while the latter is being held in a tank or other suitable container. Such a process is commonly referred to as a "padding bath" or "padding solution". The copper sulfate component of the catalyst system of the present invention can be separately applied to the textile, by any of the foregoing methods, as a pre-treatment if desired.

The concentration of the unsaturated flame retardants within the padding bath or other applicable solution will be dependent upon a number of factors including the nature of the textile, the degree of flameproofing that is desired in the finished textile as well as the technical and economical considerations known and understood by those skilled in the art. It is generally desirable, however, that the "dry add-on", i.e. the final amount of the flame retardant finish on a textile should be in the range of from about 5 to 50% as calculated on the dry weight of the untreated textile. This range of dry add-on will, in turn, provide the treated textile with about 0.5 to 10%, preferably about 1 to 5% of phosphorus as based upon the dry weight of the untreated textile. Again, it is to be stressed that the latter limits are merely illustrative and may be varied so as to provide a textile finishing having any desired degree of flame retardancy.

The thus applied flame retardant can be cured in the wet state or it can be completely or, most preferably, partially dried before curing.

Curing in accordance with the present invention requires the use of the copper sulfate-hydrogen peroxide composition described above. This composition brings about a free radical initiated reaction that induces the double bonds, i.e. the ethylenic unsaturation of the vinyl groups present in the unsaturated flame retardants, to polymerize intermolecularly so as to form a crosslinked insoluble resin in or on the individual fibers which comprise the textile substrate. In this curing reaction, the vinyl groups in the unsaturated flame retardants can react with each other, with comonomers, or with cellulose in textiles containing cellulosic components. In the latter case, the reaction is generally described in grafting.

The composition of the present invention can be conveniently activated by heating up to about 180° C., but, preferably, in the range of from about 20° C. to about 160° C. so as to avoid any thermal damage to the textile. Heating can, if desired, be accomplished by the use of steam or hot gases or by conventional oven during techniques in air or in an inert atmosphere. Alternatively, said composition can also be activated by actinic radiation.

Generally, the rate of cure of the catalytically initiated cure of the present invention is adversely influenced by the presence of atmospheric oxygen. Therefore, for an optimum cure rate, it is advantageous to exclude oxygen by use of an inert gas such as steam, nitrogen, carbon dioxide or the like. A particularly convenient means for accomplishing this effect is to conduct the final drying of the flame retardant finish at the cure temperature so that the steam being evolved forms an air excluding blanket. In a textile mill this is easily accomplished by passing the treated textile from the padder over heated metal cylinders or "cans" at a rate and temperature that is effective to initiate curing while some moisture still remains.

Actinic radiation encompasses high energy protons and other particles capable of initiating free radical reactions including ultraviolet light, x-rays, gamma rays, alpha rays, beta rays, i.e. electron beam radiation, and plasma, i.e. a highly ionized gas as obtained, for example, in corona discharges from a high voltage terminal in the presence of an easily ionized gas such as argon. A preferred source of actinic radiation involves the use of an electron beam, i.e. beta radiation, since equipment adaptable for textile mill use is readily available and is eminently suited for rapid, continuous processing. In any event, regardless of the type of actinic radiation that is used, it should be applied in a dosage which is sufficient to initiate polymerization. Thus, in the case of electron beam radiation, suitable dosages are typically in the range from about 0.1 to about 20 megarads.

When actinic radiation is used, in the process of the present invention, it is necessary to expose the treated textile to a beam from a radiation source. If desired, this can be done at ambient temperatures, in air or in an inert atmosphere, and with great rapidity, e.g. from about 0.1 seconds to several minutes, thus sparing the textile from thermal damage. A radiation induced cure is generally not as seriously affected by the presence of oxygen in the system as is a chemically induced cure. When radiation is utilized to effect the cure, the resulting finish will be tightly cured, i.e. extensively crosslinked, so as to provide it with greater durability to laundering and dry cleaning.

The exposure to actinic radiation can be conveniently conducted by passing the treated textile through the beam which can be produced, for example, by a bank of ultraviolet lamps, corona discharge points, a cobalt-60 source, an x-ray source or an electron beam source. Reasonably homogeneous radiation flux is desirable where an electron beam is used. Thus, the beam can be transversely scanned across the textile at a rapid rate so as to evenly irradiate all points thereon. If desired, a suitable mechanical arrangement of rollers can be employed so that the treated textile can be made to repeatedly pass through the radiation field, thereby facilitating more complete use of the available radiation flux while also obtaining more uniform irradiation.

The use of actinic radiation initiation does not generally require the use of a chemical activator. However, the efficiency of the radiation can frequently be improved by use of such an activator. Suitable activators for this purpose include ketones, such as acetone or benzoin; polycyclic hydrocarbons, such as polyphenyl; and, azo compounds such as azobisisobutyronitrile.

The irradiation of the treated textile is generally carried out subsequent to the application of the mixture from solution. When the textile has cellulosic components, it can be irradiated so as to form stable, long lived free radical sites, and the unsaturated flame retardant can be applied subsequent to irradiation whereupon said flame retardant will proceed to cure by grafting onto the cellulose.

The resulting cure, or polymerization of the unsaturated flame retardant is believed to take place on the surface of the individual fibers which comprise the textile substrate. In accordance with theory, it is believed that the resulting polymer network is grafted, or chemically bonded, onto the textile fiber molecules. Such grafting would explain the attainment of the durable, flame retardant finish and the excellent hand of the textiles that are treated with the flame retardants utilized in the present invention.

The unsaturated flame retardants utilized in accordance with this invention can, if desired, include the use of optional free radical curable, i.e. ethylenically unsaturated, comonomers as a means of achieving variations in the properties of the resulting treated textile. The thus added optional comonomers can form copolymers with said flame retardants during curing or polymerization. Suitable comonomers for use in conjunction with said flame retardants include:

1. Monomers containing an amide nitrogen such as acrylamide, methacrylamide, N-methylolacrylamide, N-methylolmethacrylamide, diacetonylacrylamide, hydroxymethylolated diacetonylacrylamide, methylenebisacrylamide, triacryloylhexahydrotriazine N-vinylpyrrolidone, and cellulose-grafted N-methylolacrylamide, the use of the latter monomer being disclosed in U.S. Pat. No. 3,434,161. The use of these amide nitrogen containing comonomers at a concentration of up to about 10 molecules per each vinyl group of the oligomeric vinylphosphonates, permits a more economical finish, particularly with respect to cellulosics such as cotton or the cotton component of cotton-polyester blends since less of the more costly phosphonate monomer needs to be used in order to achieve a given level of flame retardancy. From the latter group of monomers, the use of acrylamide or N-methylolacrylamide is preferred because of their low cost and high efficiency.

It is to be noted that the use of N-methylolacrylamide, N-methylolmethacrylamide or hydroxymethylated diacetonylacrylamide offers some additional advantages in view of the known ability of these monomers to attach to cellulose by acid catalyzed ether formation. Such attachments can serve to more tightly anchor the finish to textiles having cellulosic components. The requisite catalytic acid for such a reaction is generally present as the result of minor hydrolysis of the unsaturated flame retardant during curing. However, if this amount of acid is found inadequate, additional catalytic acid can be added in the form of mineral acids such as hydrochloric or phosphonic; organic acids such as citric, lactic, oxalic or glycolic; or, acidic salts such as amine hydrochlorides, magnesium chloride, zinc nitrate, or ammonium chloride.

2. Monomers containing more than one polymerizable double bond, such, for example, as the glycol diacrylates, the glycol dimethacrylates, methylene bisacrylamide, triacryloylhexahydrotriazine, triallyl phosphate, dialkyl allylphosphonates and triallyl cyanurate. By using this class of comonomers, the crosslink density of the resulting finish can be increased, thereby enhancing its durability with respect to wear and laundering.

3. Monomers contributing to flame retardancy, i.e. monomers having phosphorus, bromine or chlorine atoms in their molecules including, for example, vinyl and vinylidene halides such as vinyl chloride, vinyl bromide, vinylidene chloride, vinylidene bromide, vinylidene chlorobromide and chloroprene; triallyl phosphate, diallyl phosphonate, dialkyl vinylphosphonates such as diethyl vinylphosphonate and bis(2-chloroethyl)vinylphosphonate or its polycondensation products.

4. Monomers contributing to surface quality, i.e. "hand", softness, flexibility, smoothness of tactile quality, gloss, soil release, and abrasion resistance, for example hydroxyalkyl acrylates or methacrylates, alkoxyalkyl acrylates or methacrylates, long-chain alkyl acrylates or methacrylates, vinyl long chain alkyl acrylates or methacrylates, vinyl long-chain alkyl ethers, vinyl esters of fatty acids or fluorinated alkanoic acids, acrylic or methacrylic acid, or the like.

When utilized in the process of this invention, the above described optional comonomers can be present in the system in an amount of up to about 10 molecules per each vinyl group of the unsaturated flame retardant in the mixture with the aminoplast.

It should be noted, at this point, that the use of the term "crosslinked" in describing the cured, fire retardant resins resulting from the polymerization of the unsaturated flame retardant in the textile finishing process of this invention will indicate to those skilled in the art that these resins theoretically possess a three-dimensional configuration or network rather than a simple linear or branched structure of the type found in non-crosslinked copolymers. Moreover, as used in this disclosure, the term "fire retardant" is intended to refer to that particular property of a material which provides it with a degree of resistance to ignition and burning. Thus, a fire or flame retardant textile is one which has a low level of flammability and flame spread. This property can be conveniently evaluated by means of any of the standard flame retardancy tests.

The textile finishing process of this invention is compatible with a wide variety of other textile finishing operations which can be carried out prior, simultaneous with, or subsequent to the process of this invention. These other operations include application of durable press, softening, anti-static, abrasion resistance, water-repellent, soil-release and anti-microbial finishes as well as bleaching, dyeing, printing, flocking, laminating and texturing. Thus, the flame retardant formulations utilized in accordance with this invention can also optionally contain other types of ingredients known in the textile finishing art. For example, water and soil repellents, optical brighteners and colorants, softening agents such as polyethylene emulsions, hand-modifying agents, buffering agents, pH-controlling agents which may be acidic or basic, emulsified waxes, chlorinated paraffins, polyvinyl chloride, polyvinylidene chloride, homo- and copolymers of the alkyl acrylates and other resinous finishing agents can be added in conjunction with other finishing agents. And, where an extremely high degree of flame rerardance is required, it is possible to employ systems containing antimony oxide and a resinous binder, particularly one containing chlorine, such as a chlorinated paraffin or polyvinyl chloride, along with unsaturated flame retardants utilized in this invention.

Another class of optional additives are the aminoplasts. The use in this disclosure of the term "aminoplast" is meant tp denote a nitrogen containing resin which is capable of reacting with itself, with the unsaturated flame retardants or with the textile and which is prepared by the polycondensation of formaldehyde with a compound having at least two reactive amino or amido hydrogen atoms. Exemplary of the aminoplasts applicable for use in the textile finishing methods of this invention are methylolureas which may be either straight chained or cyclic, methylolmelamines, methylolcarbamates, methylolurons, methylolamides, methyloltriazines, the methyl ethers of the above listed methylol compounds, methylolated acid amides, dimethyl hydroxymethylcarbamoylethyl phosphonate, urea-glyoxal condensation products, urea-glyoxal-formaldehyde condensation products, N-methylolated O-alkyl carbamates. Preferred aminoplasts include tris(methoxymethyl)melamine, as sold by the American Cyanamid Company under the trademark "AEROTEX M-3"; partially methylolated methoxymethyl melamine, as sold by the American Cyanamid Company under the trademark "AEROTEX 23 SPECIAL"; dimethylolethylene urea; dimethyloldihydroxyethylene urea, dimethylol ethyl carbamate and dimethoxymethyl uron.

By combining one or more aminoplasts with the unsaturated flame retardants it is possible, if desired, to completely avoid or minimize the need for utilizing expensive and often times toxic comonomers, such as acrylamide, in preparing fire retardant textile finishes. Moreover, these novel finishes can be cured at relatively low temperatures, e.g. at 275°–280° F., and with relatively lower levels of catalysts than would ordinarily be expected. In addition, the presence of the aminoplast in these finishes serves as a buffer which prevents discoloration and tenderization of cotton fabrics thereby eliminating the need for any extraneously added buffers such as urea. These aminoplasts can be used in a concentration in the range of from about 10 to 600%, preferably about 25–300%, by weight of the unsaturated flame retardants. In general, increasing the aminoplast level allows one to use less of the unsaturated flame retardants in order to achieve a given degree of flame retardancy. Where an aminoplast or an amide comonomer is employed, the flame retardant effect of the finish can be further enhanced by inclusion of tetrakis(hydroxymethyl)phosphonium chloride or hydroxide, or tris(hydroxymethyl)phosphine in the formulation.

All types of textiles can be treated by means of the process of this invention so as to provide them with durable, fire retardant finishes. Thus, one can treat textiles derived from natural fibers such as cotton, wool, silk, sisal, jute, hemp and linen and from synthetic fibers including nylon and other polyamides; polyolefins such as polypropylene; polyesters such as polyethylene terephthalate and modified versions thereof including polyethylene terephthalates modified by inclusion of bromine or phosphorus containing additives or coreactants; cellulosics such as rayon, cellulose acetate and triacetate; fiber glass; acrylics and modacrylics, i.e. fibers based on acrylonitrile copolymers; saran fibers; i.e. fibers based on vinylidene chloride copolymers; nytril fibers, i.e. fibers based on vinylidene dinitrile copolymers; rubber based fibers; spandex fibers, i.e. fibers based on a segmented polyurethane; vinal fibers, i.e. fibers based on vinyl alcohol copolymers; vinyon fibers, i.e. fibers based on vinyl chloride copolymers; vinyon fibers, i.e. fibers based on vinyl chloride copolymers; and, metallic fibers. Textiles derived from blends of any of the above listed natural and/or synthetic fibers such, for example, as cotton-polyester, rayon-polyester, wool-nylon and other well-known blends can also be treated by means of the process of this invention.

As used in this disclosure, the term "textile" or "textiles" is meant to encompass woven or knitted fabrics as well as non-woven fabrics which consist of continuous and/or discontinuous fibers bonded so as to form a fabric by mechanical entanglement, thermal interfiber bonding or by the use of adhesive or bonding substances. Such non-woven fabrics can contain as much as 100% of wood pulp as well as conventional textile fibers in which case part of the bonding process is achieved by means of hydrogen bonding between the cellulosic pulp fibers. In non-woven fabrics, the finishing agents of this invention can function not only as flame retardant finishes but can also contribute to the interfiber bonding resin component. This dual role can also be played by the finishing agents of this invention in fabric laminates and in flocked fabrics where the finishing agent can at the same time serve as the interlaminar bonding agent or flocking adhesive as well as the flame retardant. In both of these systems, i.e. non-woven fabrics and laminated fabrics, the finishing agents of this invention can also be blended with the usual bonding agents such, for example, as acrylic emulsion polymers, vinyl acetate homo- and copolymer emulsions, styrene-butadiene rubber emulsions, urethane resin emulsions, polyvinyl chloride emulsions, vinyl chloride alkyl acrylate copolymer emulsions, polyacrylates modified by vinyl carboxylic acid comonomers and the like.

The following examples are submitted to illustrate but not to limit the present invention.

EXAMPLE I

Several tests were run according to the following procedures and definitions.

1. APPLICATION: All experimental materials were applied by padding from aqueous solutions to various fabrics.
2. WASHING PROCEDURE (FOR DURABILITY)
   a. One hot water wash cycle (HW) in a Maytag washing machine using water at 60° C. and 8 towels for ballast.
   b. The above hot water wash cycle plus repeated detergent washes (DW). To each detergent wash approximately 50 g detergent were added in addition to the towels for ballast.
3. ADD-ON (%): The amount by weight of chemicals applied to the fabric based on the weight of the untreated fabric expressed as a percentage.
4. HAND: Subjective Test No. 1 equal to untreated fabric No. 2 is marginally firmer. No. 3 is significantly firmer and could still be corrected with additives. No. 4 is considered quite firm and No. 5 is stiff and boardy.
5. L.O.I. (LIMITING OXYGEN INDEX): Minimum amount of oxygen in an oxygen-nitrogen atmosphere required to sustain burning in a downward direction.
6. CHAR LENGTH (VERTICAL FLAME TEST): In this test the fabric is suspended vertically with the base of the fabric ¾ in. above a bunsen burner (gas = methane) having a flame height of 1½ in. The flame is held under the sample for 3 seconds and then withdrawn. Char length is the length in inches of charred fabric measured from the base of the fabric upward.
7. B.E.L.: Burned Entire Length
8. The oligomeric vinylphosphonate utilized was a co-condensate of bis(2-chloroethyl)vinylphosphonate with dimethyl methylphosphonate in a 1:1.07 ratio.

TEST SERIES A

A series of tests were run on 100% cotton flannel weighing 3.7 and 3.8 ounces per square yard. These tests give a comparison of hand and flammability qualities of iron and copper catalysts.

| Run Number | % Solid | a | b | c | d | e | f | g | h | i | j | k | l |
|---|---|---|---|---|---|---|---|---|---|---|---|---|---|
| Formulation | | Percent Product In Bath (By weight) | | | | | | | | | | | |
| Water | — | 40 | 40 | 37.5 | 45 | 42.5 | 27.5 | 59 | 59 | 57 | 57 | 56 | 56 |
| Oligomeric Vinylphosphonate | 100 | 35 | 35 | 35 | 30 | 30 | 35 | 32 | 32 | 32 | 32 | 32 | 32 |
| $H_2O_2$ | 30 | 5 | 5 | 5 | 5 | 5 | 5 | 7 | 7 | 8 | 8 | 10 | 10 |
| $CuSO_4 \cdot 5H_2O$ | | | | | | | | 2 | 2 | 3 | 3 | 2 | 2 |
| Ferric $SO_4$ | 2.5 | 20 | | 20 | | 20 | | | | | | | |
| Ferrous $SO_4$ | 1.25 | | 20 | | 20 | | 35 | | | | | | |
| $Na_2S_2O_3$ | 20 | | | 7.5 | | 7.5 | | | | | | | |
| Dry Temp. ° F. | | 250 | 250 | 250 | 250 | 250 | 250 | | | | | | |
| Cure Temp. ° F. | | 350 | 350 | 350 | 350 | 350 | 350 | 250/270 | 250 | 250 | 270 | 250 | 250/270 |
| Cure Time min. | | 3 | 3 | 3 | 3 | 3 | 3 | 2/2 | 4 | 4 | 3 | 4 | 2/2 |
| pH of Solution | | 2.0 | 2.4 | 2.2 | 2.4 | 2.2 | 2.4 | 2.9 | 2.9 | 3.0 | 3.0 | 3.1 | 3.1 |
| % Wet Pickup | | 107.9 | 105.9 | 105.6 | 100.4 | 102.8 | 104.0 | 105.3 | 108.6 | 105.9 | 105.8 | 104.8 | 107.9 |
| % Add-on (Dry) | | 28.3 | 26.9 | 31.3 | 21.0 | 25.7 | 26.6 | 25.8 | 26.2 | 24.7 | 27.0 | 25.0 | 27.2 |
| % Add-on (Cond.)* | 33.6 | 32.2 | 37.0 | 25.9 | 31.4 | 31.1 | 29.5 | 30.5 | 29.6 | 30.2 | 29.3 | 30.9 | |
| Hand before wash | | 4.0 | →→→→→ | | | | 1.5 | 1.5 | →→→→→ | | | | |
| Hand after HW | | 3.0 | →→→→→ | | | | 1.0 | 1.5 | →→→→→ | | | | |
| Hand after 10 DW | | 2.0 | →→→→→ | | | | 1.0 | 1.5 | →→→→→ | | | | |
| Color before wash | | Yellow | →→→→→ | | | | Off White | Very lt. Yellow | →→→→→ | | | | |
| Color after HW | | Lt. Brown | →→→→→ | | | | V.V. | Off | →→→→→ | | | | |

TEST SERIES A-continued

A series of tests were run on 100% cotton flannel weighing 3.7 and 3.8 ounces per square yard. These tests give a comparison of hand and flammability qualities of iron and copper catalysts.

| Run Number | % Solid | a | b | c | d | e | f | g | h | i | j | k | l |
|---|---|---|---|---|---|---|---|---|---|---|---|---|---|
| Formulation | | | | | | Percent Product In Bath (By weight) | | | | | | | |
| | | | | | | lt. Brown | White | | | | | | |
| Flammability Char Length (in.) after (HW) | | 3¼ | 2½ | 3 | 3 | 2¾ | B.E.L. | 3¼ | 3¼ | 3¼ | 3 | 2¾ | 3 |

*Cond. - add-on after treated fabric has had opportunity to absorb moisture from the atmosphere.

TEST SERIES B

A series of tests was run on napped, printed and dyed cotton weighing 3.9 ounces per square yard. These tests show the effect of using various amounts of N-methylol acrylamide and a comparison to a persulfate catalyst. Drying was at 250° F. for 2 minutes and curing was at 350° F. for 1 minute.

| Run Number | % Solid | a | b | c | d | e | f | g | h | i | j |
|---|---|---|---|---|---|---|---|---|---|---|---|
| Formulation | | | | | Percent Product in Bath (By weight) | | | | | | |
| Water | | 64 | 61 | 59 | 64 | 61 | 57 | 57 | 54 | 51 | 47 |
| Oligomeric vinylphosphonate | 100 | 27 | 30 | 32 | 25 | 27 | 30 | 27 | 15 | 18 | 22 |
| N-methylol acrylamide | 60 | — | — | — | 5 | 6 | 7 | 6 | 25 → | | |
| $H_2O_2$ | 30 | 7 → | | | 4 → | | | | 4 → | | |
| $CuSO_4 \cdot 5H_2O$ (Soln.) | 10 | 2 → | | | 2 → | | | | 2 → | | |
| $Na_2S_2O_8$ | 5 | — | — | — | — | — | — | 30 | | | |
| pH of Solution | | 2.5 | 2.4 | 2.5 | 2.6 | 2.6 | 2.7 | 2.7 | 3.6 | 3.8 | 3.5 |
| % Wet pickup | | 95.1 | 93.2 | 96.1 | 94.2 | 92.6 | 93.9 | 92.6 | 89.3 | 89.9 | 100.4 |
| % Add-on (Dry) | | 17.7 | 20.4 | 22.5 | 18.7 | 19.9 | 23.7 | 21.2 | 19.4 | 21.9 | 26.7 |
| % Add-on (Cond.) | | 21.6 | 24.0 | 26.6 | 22.2 | 24.3 | 28.0 | 26.1 | 23.8 | 26.3 | 31.0 |
| HAND | | | | | | | | | | | |
| Before Wash | | 1.5 | 1.5 | 1.5 | 1.5 | 1.5 | 1.5 | 3.0 | 1.5 | 1.5 | 1.5 |
| After (HW) | | 1.5 | 1.5 | 1.5 | 1.5 | 1.5 | 1.5 | 2.0 | 1.5 | 1.5 | 1.5 |
| After 50 (DW) | | — | — | — | 1.5 | 1.5 | 1.5 | 1.5 | 1.5 | 1.5 | 1.5 |
| COLOR | | | | | | | | | | | |
| Before Wash | | Lt. Tan | Yellow Cast | Yellow Cast | Yellow Cast | Yellow Cast | Yellow Cast | Slt. Yel. → | | | |
| | | | | | | | | Cast Lt. | | | |
| After (HW) | | Lt. Tan | Cast Yellow | Cast Yellow | Cast Yellow | Cast Yellow | Cast Yellow | Tan Lt. Tan | Slt. Yel. → Cast | | |
| After 50 (DW) | | — | — | — | Sltly. Faded → | | | Sltly. Faded | Sltly. Faded → | | |
| FLAMMABILITY Char Length (in.) after (HW) | | 4¼ | 5¼ | 4¾ | 3¼ | 3¼ | 3¼ | 3 | 3½ | 2¾ | 3 |

TEST SERIES C

This series was run on sulfur dyed plaid flannel cloth weighing 7.7 ounces per square yard. Acetic acid and N-methylol acrylamide were used as additives. Drying was at 250° F. for 5 minutes and curing was at 350° F. for 1 minute.

| Run Number | % Solid | a | b | c |
|---|---|---|---|---|
| Formulation | | Weight Percent Product in Bath | | |
| Water | | 47 → | | |
| Oligomeric vinylphosphonate | 100 | 14 → | | |
| $H_2O_2$ | 30 | 7 → | | |
| $CuSO_4 \cdot 5H_2O$ | 10 | 2 → | | |
| N-methylol acrylamide | 60 | 28 → | | |
| Acetic Acid | 100 | 2 → | | |

-continued

| Run Number | % Solid | a | b | c |
|---|---|---|---|---|
| pH of Solution | | 2.8 → | | |
| % Wet pickup | | 83.2 | 85.4 | 84.5 |
| % Add-on (Dry) | | 18.4 | 16.4 | 17.0 |
| % Add-on (Cond.) | | 24.4 | 16.0 | 24.2 |
| HAND After (HW) | | 1.5 | 1.5 | 1.5 |
| COLOR Before wash. | | | | |
| After (HW) | | Slight Change → | | |
| FLAMMABILITY Char length (in.) after (HW) | | 1.63 | 1.13 | 1.25 |

TEST SERIES D

This series was run on a 35:65 polyester:cotton blend weighing 3.7 ounces per square yard. Drying was at 250° F. for 2 minutes and curing was at 350° F. for 1 minute.

| Run Number Formulation | % Solid | a | b | c |
|---|---|---|---|---|
| | | Percent Product in Bath | | |
| Water | | 36 | 16 | 26 |
| Oligomeric vinylphosphonate | 100 | 40 | 40 | 40 |
| N-methylol acrylamide | 60 | 15 | 15 | 15 |
| H$_2$O$_2$ | 30 | 7 | 7 | 7 |
| CuSO$_4$ . 5H$_2$O | 10 | 2 | 2 | 2 |
| Na$_2$S$_2$O$_8$ | 5 | — | 20 | 10 |
| pH of Solution | | 3.0 | 3.2 | 3.2 |
| % Wet pickup | | 91.5 | 89.7 | 91.1 |
| % Add-on (Dry) | | 31.6 | 32.8 | 34.1 |
| % Add-on (Cond.) | | 42.3 | 43.0 | 44.4 |
| HAND | | | | |
| Before wash | | 2.0 | 2.5 | 2.5 |
| After (HW) | | 1.5 | 2.0 | 2.0 |
| After (DW) | | 1.5 | 1.5 | 1.5 |
| COLOR | | | | |
| Before Wash | | Tan | Tan | Tan |
| After (HW) | | Tan | Tan | Tan |
| After (DW) | | Tan | Tan | Tan |
| FLAMMABILITY | | | | |
| Char length (in.) after (HW) | | 2 | 2¾ | 2½ |
| Char length (in.) after 50 (DW) | | 2¾ | 3 | 2¾ |

EXAMPLE II

Several formulations utilizing the catalyst of the present invention were studied for gel times. It was found that the formulations could sit for relatively long times without gel formation. The results are summarized below.

| Run Number Formulation | % Solid | a | b | c | d | e |
|---|---|---|---|---|---|---|
| | | Weight Product in Bath | | | | |
| Water | | 54.5 | 50.9 | 47.7 | 43.7 | 49 |
| Triton* X-100 | 10 | 0.1 → | | | | — |
| Protolube** | 20 | 4.0 → | | | | — |
| Oligomeric Vinylphosphonate | 100 | 10.8 | 12 | 13.2 | 14.4 | 14 |
| N-methylol acrylamide | 60 | 21.6 | 24 | 26.4 | 28.8 | 28 |
| H$_2$O$_2$ | 30 | 7 → | | | | |
| CuSO$_4$ . 5H$_2$O | | 2 → | | | | |
| Gel time | | No gel in 96 hours → | | 78 hrs. | 67 hrs. | No gel in 72 hrs. |

*Wetting Agent
**Softening Agent

Having set forth the general nature and some examples of the present invention, the scope is now particularly set forth in the appended claims.

What is claimed is:

1. A composition for curing an unsaturated flame retardant on a textile comprising copper sulfate and hydrogen peroxide wherein said unsaturated flame retardant comprises at least one copolycondensed oligomeric vinylphosphonate consisting essentially of the product resulting from the reaction, in stoichiometric ratio of from about 1:10 to 10:1, between a bis (2-haloalkyl) vinylphosphonate and at least one pentavalent phosphorus ester of the structure ROP(=O)XY where R is selected from the class consisting of C$_1$-C$_{20}$ alkyl and C$_1$-C$_{20}$ chloro- or bromoalkyl groups and X and Y are groups selected from the class consisting of RO—, C$_1$-C$_{20}$ alkyl, C$_2$-C$_{20}$ alkenyl, phenyl, phenoxy, amino, C$_1$-C$_{20}$ alkyl substituted amino, phenyl substituted amino, C$_2$-C$_{20}$ alkylene bonded to the same or to another ROP(=O) moiety and C$_2$-C$_{20}$ alkyleneoxy and C$_2$-C$_{20}$ alkylenedioxy bonded to the same or to another ROP(=O) moiety, wherein said reaction is carried out at an elevated temperature for a period of time sufficient to evolve R-halide as a byproduct and to form a P(O)-O-alkylene-O-P(O) linkage, with the proviso that said product is not the homocondensed product of said bis (2-haloalkyl) vinylphosphonate and the weight ratio of copper sulfate to hydrogen peroxide is from about 1:1 to about 1:210.

* * * * *